(12) United States Patent
Miyamoto et al.

(10) Patent No.: US 9,227,745 B2
(45) Date of Patent: Jan. 5, 2016

(54) BAG MAKING AND PACKAGING MACHINE

(75) Inventors: Hideshi Miyamoto, Shiga (JP); Masashi Kondo, Shiga (JP)

(73) Assignee: ISHIDA CO., LTD., Kyoto (JP)

( * ) Notice: Subject to any disclaimer, the term of this patent is extended or adjusted under 35 U.S.C. 154(b) by 722 days.

(21) Appl. No.: 13/585,372

(22) Filed: Aug. 14, 2012

(65) Prior Publication Data
US 2013/0059709 A1    Mar. 7, 2013

(30) Foreign Application Priority Data

Sep. 7, 2011    (JP) .................................. 2011-194926

(51) Int. Cl.
| | |
|---|---|
| B31B 19/00 | (2006.01) |
| B65B 9/207 | (2012.01) |
| B65B 1/22 | (2006.01) |
| B65B 9/20 | (2012.01) |
| B65B 51/30 | (2006.01) |

(Continued)

(52) U.S. Cl.
CPC ................. *B65B 9/207* (2013.01); *B29C 65/18* (2013.01); *B29C 65/74* (2013.01); *B29C 66/1122* (2013.01); *B29C 66/4312* (2013.01); *B29C 66/8351* (2013.01); *B29C 66/849* (2013.01); *B65B 1/22* (2013.01); *B65B 9/2028* (2013.01); *B65B 9/2049* (2013.01); *B65B 51/306* (2013.01); *B29C 66/4322* (2013.01); *B29C 66/934* (2013.01)

(58) Field of Classification Search
CPC .... B65B 9/213; B65B 9/2007; B65B 9/2028; B65B 9/2049; B65B 1/22; B65B 1/306; B29C 65/18; B29C 65/74; B29C 66/1122; B29C 66/4312; B29C 66/8351; B29C 66/849

USPC .......... 53/437, 451, 525, 551, 374.8; 493/186
See application file for complete search history.

(56) References Cited

U.S. PATENT DOCUMENTS

| | | | | |
|---|---|---|---|---|
| 2,592,581 | A | * | 4/1952 | Lorig ................................ 226/3 |
| 2,828,590 | A | * | 4/1958 | Swartz et al. ................... 53/431 |

(Continued)

FOREIGN PATENT DOCUMENTS

| | | |
|---|---|---|
| EP | 2489594 A2 | 8/2012 |
| GB | 1278562 A | 6/1972 |

(Continued)

OTHER PUBLICATIONS

Extended European Search Report of the corresponding European Application No. 12182633.3, dated Dec. 21, 2012.

(Continued)

*Primary Examiner* — Gloria R Weeks
*Assistant Examiner* — Justin Citrin
(74) *Attorney, Agent, or Firm* — Global IP Counselors, LLP

(57) ABSTRACT

A bag making and packaging machine forms a first transverse seal portion in a packaging material formed in a tubular shape, fills the packaging material with articles, thereafter further forms a second transverse seal portion to make a bag, and allows the bag to fall, and is equipped with a vibrating mechanism. The first transverse seal portion is formed in a direction perpendicular to a conveyance direction of the packaging material. The vibrating mechanism tilts the packaging material to an outer side of a fall path of the bag and vibrates the packaging material after the packaging material has been filled with the articles and before the second transverse seal portion is formed.

20 Claims, 12 Drawing Sheets

(51) Int. Cl.
*B29C 65/18* (2006.01)
*B29C 65/74* (2006.01)
*B29C 65/00* (2006.01)

(56) References Cited

U.S. PATENT DOCUMENTS

| | | | | |
|---|---|---|---|---|
| 3,525,193 | A | * | 8/1970 | Cutler et al. .................... 53/437 |
| 4,262,473 | A | * | 4/1981 | Brooke ........................... 53/450 |
| 5,235,794 | A | | 8/1993 | Center |
| 5,452,490 | A | * | 9/1995 | Brundula et al. ............... 15/182 |
| 5,473,866 | A | * | 12/1995 | Maglecic et al. ............... 53/511 |
| 5,540,035 | A | * | 7/1996 | Plahm et al. .................... 53/451 |
| 5,727,370 | A | * | 3/1998 | Sperry ............................ 53/472 |
| 2007/0261366 | A1 | * | 11/2007 | Iwamoto et al. ............. 53/136.1 |
| 2012/0204514 | A1 | * | 8/2012 | Miyamoto et al. ............. 53/235 |

FOREIGN PATENT DOCUMENTS

| | | |
|---|---|---|
| JP | 2000-025721 A | 1/2000 |
| JP | 2006-069626 A | 3/2006 |
| JP | 2006-069629 A | 3/2006 |
| WO | 9413537 A1 | 6/1994 |

OTHER PUBLICATIONS

Office Action of the corresponding Japanese Patent Application No. 2011-194926, dated Apr. 28, 2015.

* cited by examiner

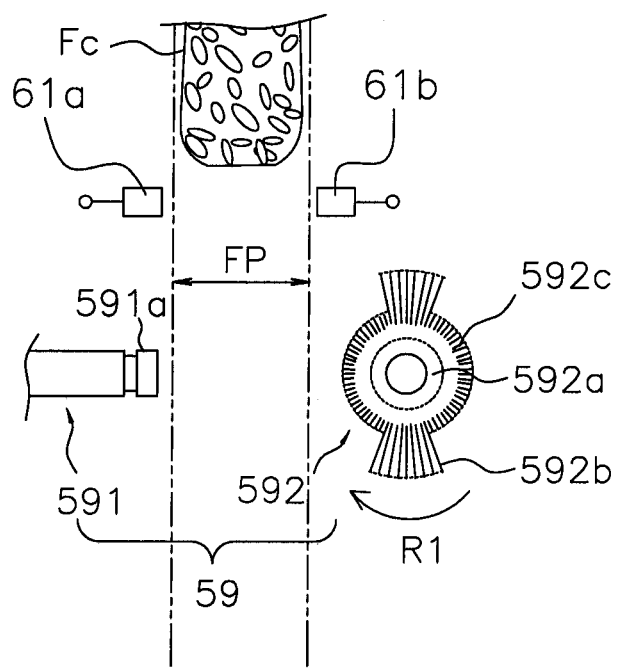
F I G. 7

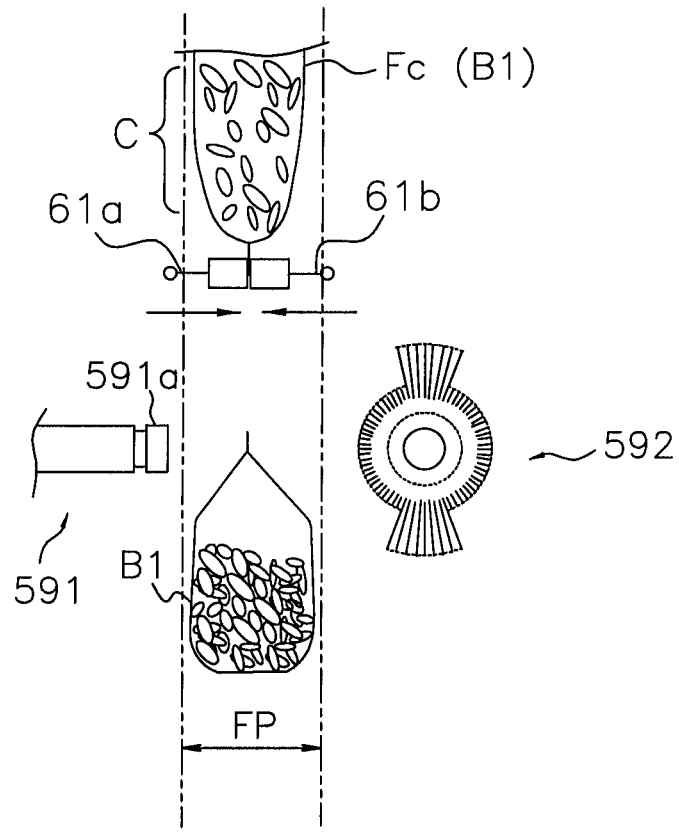
F I G. 9

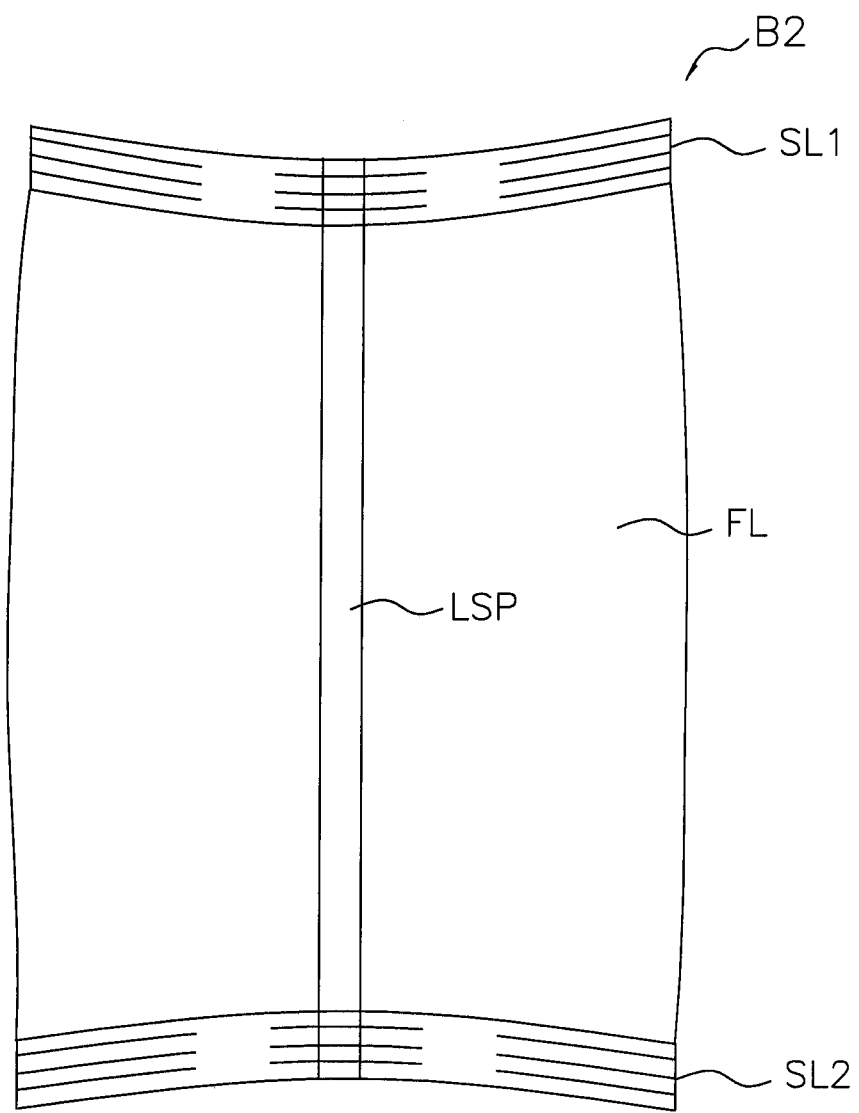
F I G. 1 3

BAG MAKING AND PACKAGING MACHINE

BACKGROUND

1. Technical Field

The present invention relates to a bag making and packaging machine.

2. Related Art

Bag making and packaging machines are used as machines that perform bag making and packaging while filling the inside of a packaging material with articles (contents) such as confectioneries. Bag making and packaging machines longitudinally seal a band-like packaging material to form a tubular packaging material and thereafter transversely seal the tubular packaging material. The transversely sealed tubular packaging material is thereafter cut by a cutter and becomes a bag. Incidentally, in a case where the articles with which the bag is filled are a collection of articles whose specific gravity is small, such as potato chips, the articles accumulate sparsely inside the packaging material. That is, inside the packaging material, the articles pile on top of each other with large spaces in between. For that reason, the quantity of the articles with which the inside of the packaging material is filled decreases, which is inconvenient. Therefore, in patent document 1 (JP-A No. 2000-25721), a method of adjusting the bulk of the articles by pressing the side surfaces of the tubular packaging material with pressing members disposed on the side surfaces of the tubular packaging material is proposed.

However, although the technology proposed in the above document can adjust the bulk of the articles inside the packaging material, it cannot sufficiently prevent biting of the articles (e.g., potato chip fragments, seasonings added to potato chips, etc.) into a sealed place when the packaging material is transversely sealed. The biting of the articles into the sealed place causes damage to the bag.

SUMMARY OF THE INVENTION

It is an object of the present invention to provide a bag making and packaging machine that can raise the fill rate of articles in a tubular packaging material and reduce biting of the articles into a portion of the packaging material that subsequently forms a seal portion.

A bag making and packaging machine pertaining to the present invention is configured to form a first transverse seal portion in a tubular shaped packaging material, fill the packaging material with articles, thereafter further form a second transverse seal portion to make a bag, and allow the bag to fall, and further includes a vibrating mechanism. The first transverse seal portion is formed in a direction orthogonal to a conveyance direction of the packaging material. The vibrating mechanism tilts the packaging material to an outer side of a fall path of the bag and vibrates the packaging material after the packaging material has been filled with the articles and before the second transverse seal portion is formed.

Because of this, the fill rate of the articles can be raised, and biting of the articles into the sealed place can be reduced.

Moreover, it is preferred that the bag making and packaging machine is further equipped with a longitudinal sealing mechanism and a transverse sealing mechanism. The longitudinal sealing mechanism forms the packaging material into a tubular shape by heat-sealing both width direction sides of the packaging material. The transverse sealing mechanism heat-seals the tubular packaging material in a direction orthogonal to the tubular packaging material to form a sealed place and further cuts the sealed place to form the first transverse seal portion and the second transverse seal portion.

Further, it is preferred that the vibrating mechanism includes a rotating brush and a tilting member. The rotating brush is placed in a first position located on the outer side of the fall path. The tilting member is placed in a second position. The second position is a position located on the outer side of the fall path and opposing the first position across the fall path of the bag. Further, it is preferred that the tilting member tilts the neighborhood of the first transverse seal portion positioned in the fall path to the outer side of the fall path to bring the neighborhood of the first transverse seal portion into contact with the rotating brush. Because of this, the bag can be vibrated by the rotating brush placed on the outer side of the fall path.

Further, it is preferred that the tilting member has a contact section that contacts the bag. It is preferred that the contact section contacts the neighborhood of the first transverse seal portion and tilts the neighborhood of the first transverse seal portion toward the first position before the second transverse seal portion is formed. Further, it is preferred that the rotating brush contacts and imparts vibration to the neighborhood of the first transverse seal portion tilted by the contact section. Because of this, vibration can be imparted reliably to the neighborhood of the lower seal portion.

Moreover, it is preferred that the rotating brush has first sections and second sections. The first sections are sections in which bristles of a first length are implanted. The second sections are sections in which bristles of a second length longer than the first length are implanted. Because of this, large vibration can be imparted to the neighborhood of the lower seal portion.

Further, it is preferred that the rotating brush rotates in the opposite direction of the direction in which the tubular packaging material extends. Because of this, the neighborhood of the lower seal portion can be vibrated effectively.

According to the bag making and packaging machine pertaining to the present invention, the fill rate of the articles can be raised and biting of the articles into the sealed place can be reduced.

BRIEF DESCRIPTION OF THE DRAWINGS

FIG. 7 is a view showing the movement of a vibrating mechanism.

FIG. 9 is a view showing the movement of the vibrating mechanism.

FIG. 13 is a rear view of a pillow bag pertaining to a modification.

DETAILED DESCRIPTION OF THE INVENTION

A bag making and packaging machine 100 pertaining to an embodiment of the present invention will be described below with reference to the drawings. "Up", "down", "left", "right", "front", and "rear" in the description of the bag making and packaging machine 100 are as defined in FIG. 3.

(1) Overall Configuration

Figure 1:
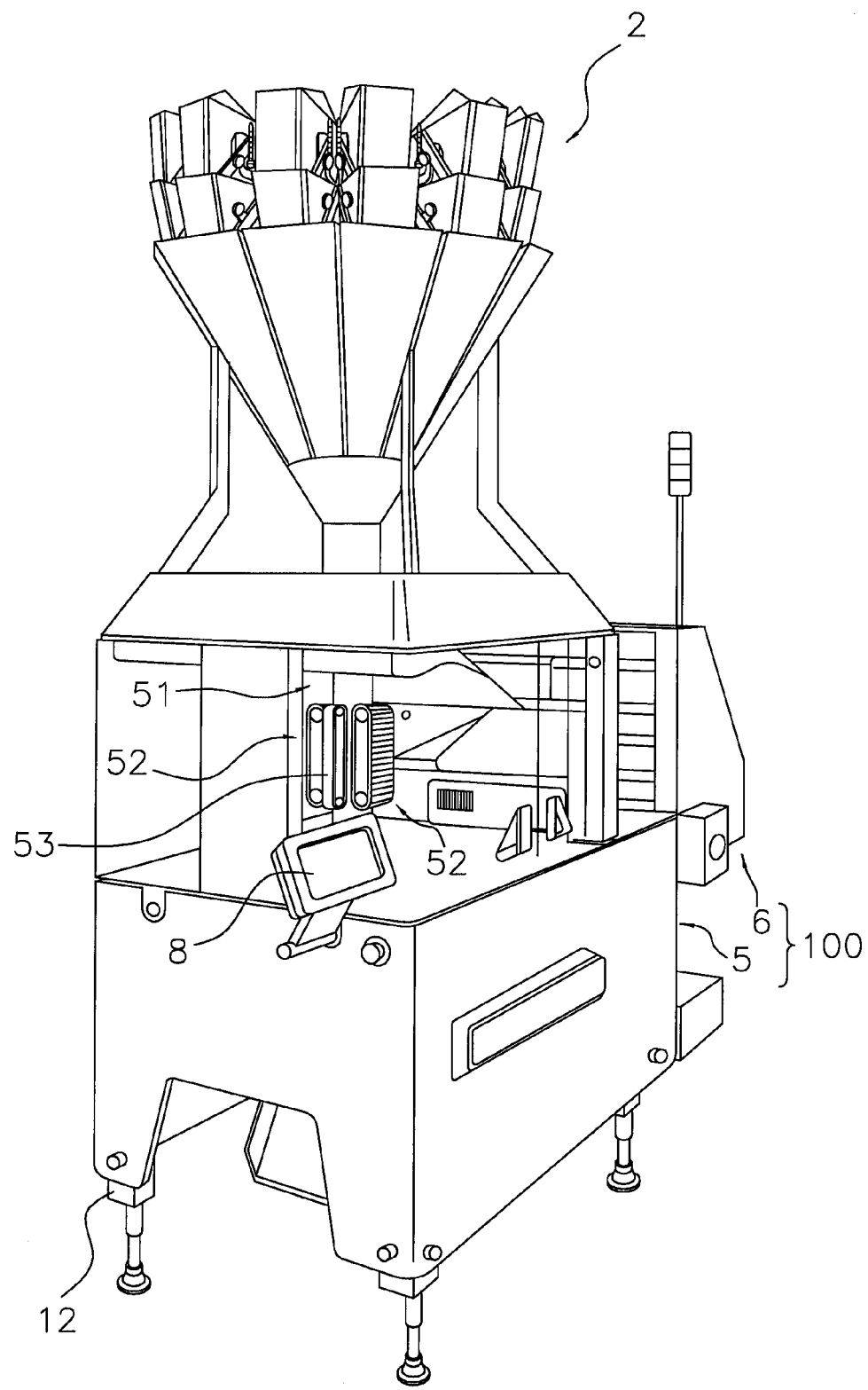
FIG. 1 is an external perspective view of a bag making and packaging machine pertaining to an embodiment of the present invention.
Figure 2:
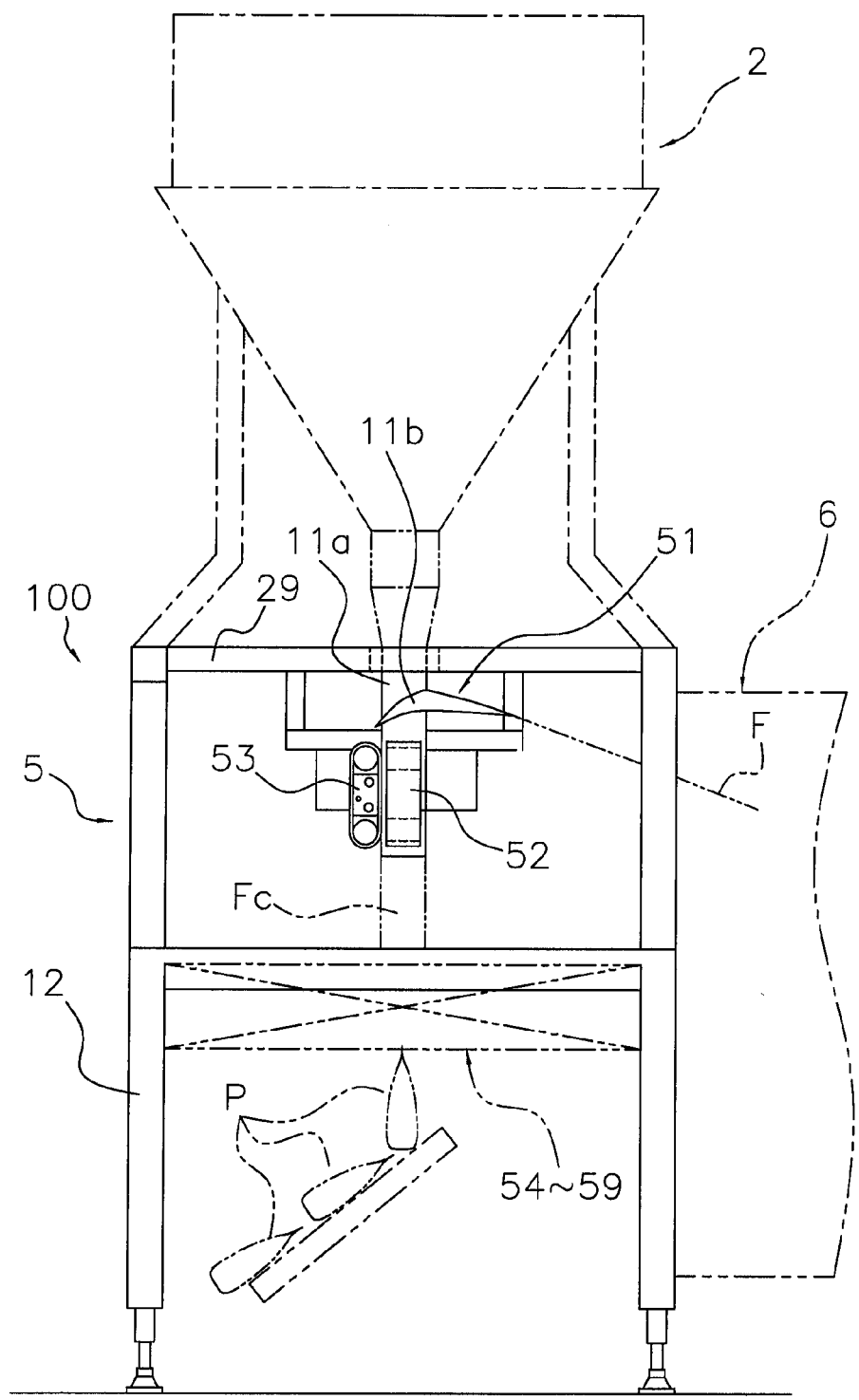
FIG. 2 is a schematic side view of the bag making and packaging machine.

FIG. 1 and FIG. 2 show the overall configuration of the bag making and packaging machine 100. The bag making and packaging machine 100 is a machine that makes products P (bags B1) comprising bagged articles C. The bag making and packaging machine 100 pertaining to the present embodiment bags articles C whose specific gravity is light such as a snack food and which include seasonings and so forth.

Figure 6:
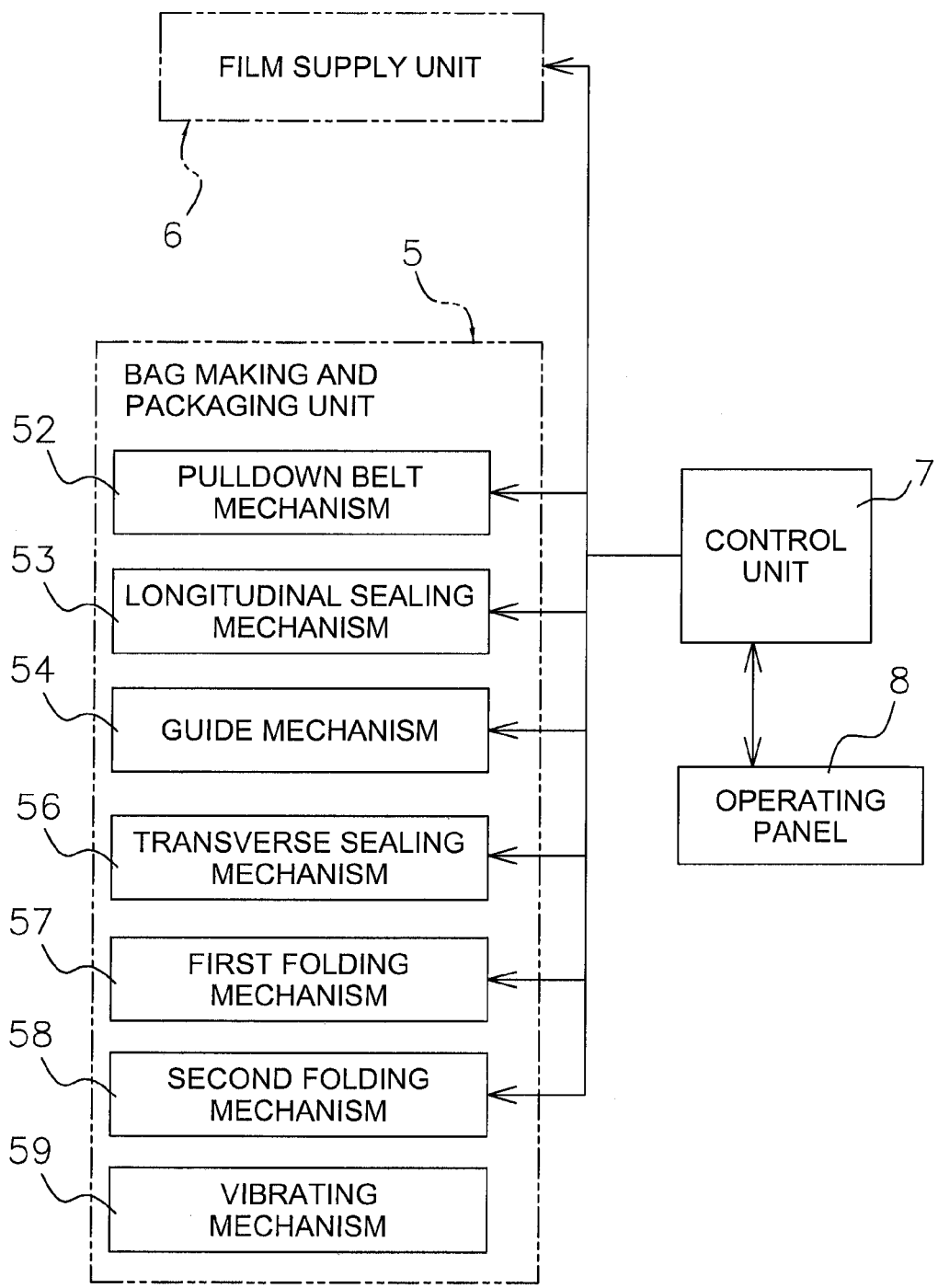
FIG. 6 is a control block diagram of the bag making and packaging machine.

The bag making and packaging machine 100 has a bag making and packaging unit 5, a film supplying unit 6, and a control unit 7 (see FIG. 6). The bag making and packaging unit 5 packs the articles C into the bags B1 while forming the bags B1. The film supplying unit 6 supplies a film F that becomes the material of the bags B1 to the bag making and packaging unit 5. The control unit 7 controls the operation of the entire bag making and packaging machine 100. A combination weighing unit 2 is placed above the bag making and packaging unit 5. In the bag making and packaging unit 5, a predetermined quantity of the articles C weighed by the combination weighing unit 2 is bagged.

An operation panel 8 is placed in front of the bag making and packaging unit 5. The operation panel 8 has a liquid crystal display and a touch panel that covers the liquid crystal display. The operation panel 8 shows the operating state of the bag making and packaging machine 100 to an operator standing on the right side of the bag making and packaging machine 100. Further, the operation panel 8 accepts the input of various commands from the operator with respect to the bag making and packaging machine 100.

Figure 10:
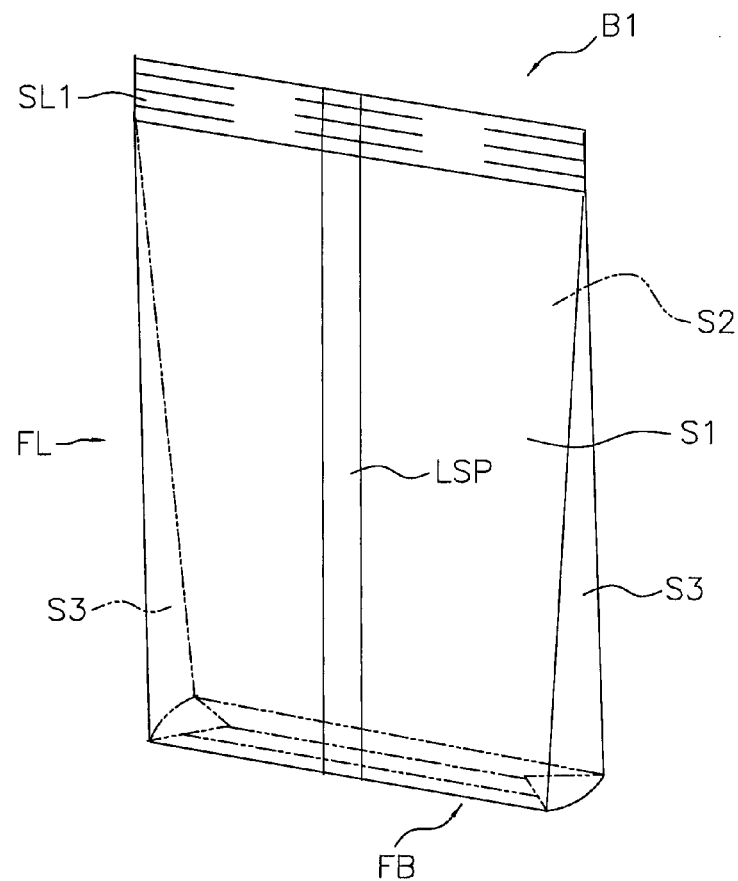
FIG. 10 is a perspective view of a flat-bottom bag.
Figure 11:
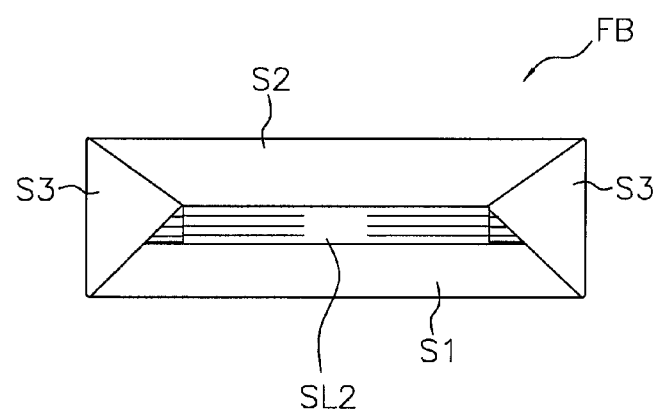
FIG. 11 is a bottom view of the flat-bottom bag.

The bag making and packaging machine 100 makes flat-bottom bags B1. The flat-bottom bags B1 are self-standing bags having a bottom portion FB. FIG. 10 shows an external perspective view of the flat-bottom bag B1, and FIG. 11 shows the bottom portion FB of the flat-bottom bag B1. The bag B1 has a bag body portion FL that surrounds the articles C, an upper seal portion (a second transverse seal portion) SL1 (see FIG. 10) that closes the upper side of the bag body portion FL, and a lower seal portion (a first transverse seal portion) SL2 (see FIG. 11) that closes the lower side of the bag body portion FL. A longitudinal seal portion LSP that extends in the longitudinal direction is formed on the back surface of the bag B1. The bag body portion FL has a first surface S1 that has the longitudinal seal portion LSP, a second surface S2 that opposes the first surface S1, and side surfaces S3 and S3 that are sandwiched between the first surface S1 and the second surface S2. The bottom portion FB mainly comprises the lower seal portion SL2, the lower portion of the first surface S1, the lower portion of the second surface S2, and the lower portions of the side surfaces S3 and S3.

The bag making and packaging machine 100 forms the sheet-like film F supplied by the film supplying unit 6 into a tubular film Fc. The bag making and packaging machine 100 further forms the lower seal portion SL2 in the tubular film Fc while filling the tubular film Fc with a mass of the articles C and thereafter transforms the lower seal portion SL2 to form the bottom portion FB in the tubular film Fc. Thereafter, the bag making and packaging machine 100 forms the upper seal portion SL1 in the tubular film Fc and cuts apart the flat-bottom bag B1 having the upper seal portion SL1, the body portion FL, and the bottom portion FB from the tubular film Fc.

The configuration of the bag making and packaging unit 5 will be described in detail below.

(2) Bag Making and Packaging Unit

Figure 3:
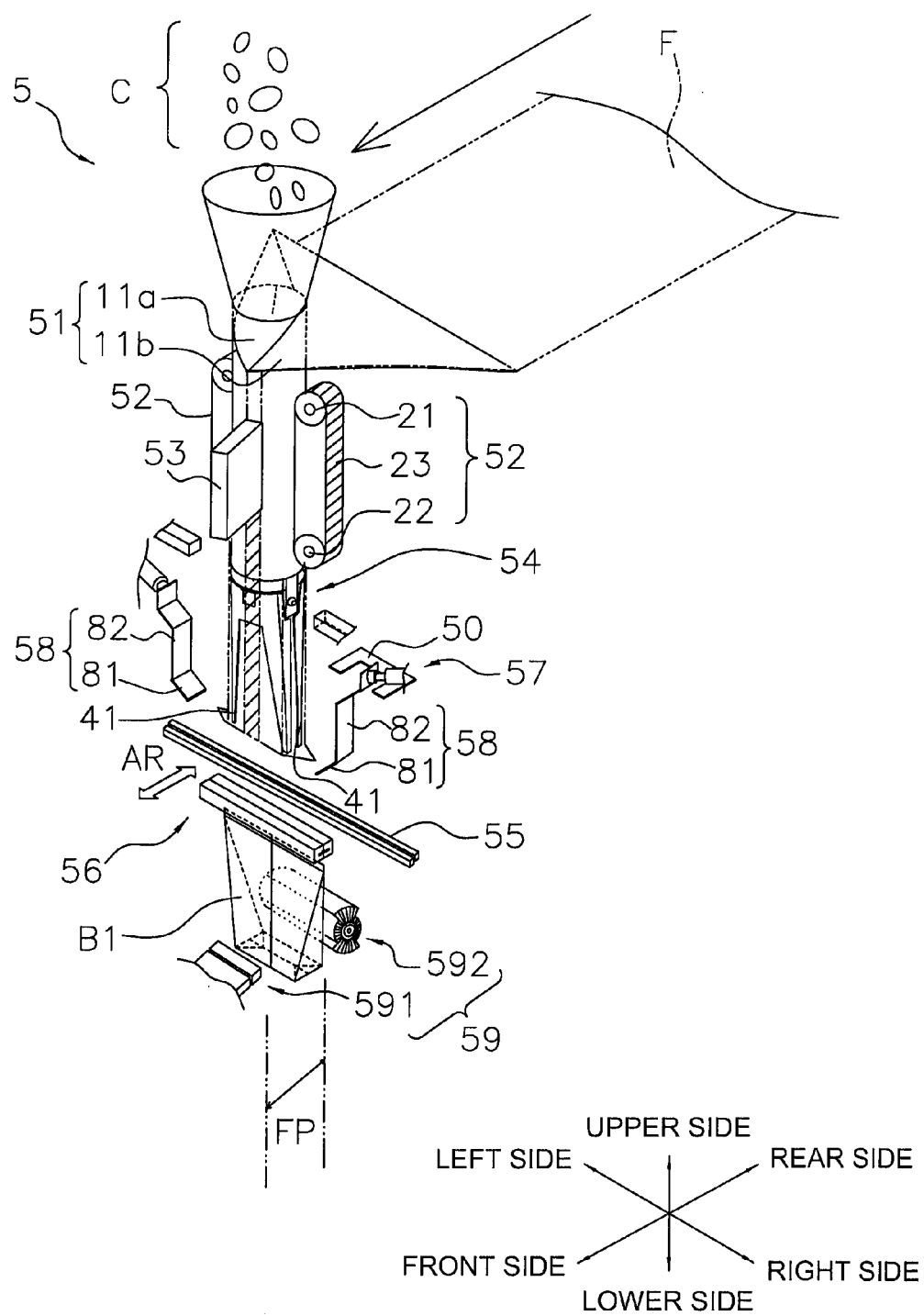
FIG. 3 is a schematic perspective view of the bag making and packaging machine.

As shown in any of FIG. 1 to FIG. 3, the bag making and packaging unit 5 has a forming mechanism 51, pull-down belt mechanisms 52 and 52, a longitudinal sealing mechanism 53, a guide mechanism 54, a shutter mechanism 55, a transverse sealing mechanism 56, a first folding mechanism 57, second folding mechanisms 58 and 58, a vibrating mechanism 59, and a support frame 12 that supports these mechanisms.

(2-1) Forming Mechanism

The forming mechanism 51 (also referred to as a tube formation mechanism) forms the sheet-like film F sent from the film supplying unit 6 into a tubular shape. As shown in FIG. 2 and FIG. 3, the forming mechanism 51 has a tube 11a and a former 11b. The tube 11a is a tubular member extending in the up-and-down direction and has openings in its upper and lower ends. The tube 11a is placed in an open section in the center of a ceiling plate 29 of the support frame 12 and is integrated with the former 11b via an unillustrated bracket. As shown in FIG. 3, the articles C falling a predetermined quantity at a time from the combination weighing unit 2 (see FIG. 1) are dropped into the tube 11a from the opening in the tube 11a and fall through the inside of the tube 11a. The former 11b is placed in such a way as to surround the tube 11a. The shape of the former 11b is a shape by which the film F is wrapped around the outer surface of the tube 11a while passing through a space between the former 11b and the tube 11a and is formed from a sheet-like shape into a tubular shape. The former 11b is also fixed to the support frame 12 via an unillustrated support member.

(2-2) Pull-Down Belt Mechanisms

The pull-down belt mechanisms 52 and 52 (also referred to as a conveyance mechanism) are supported by support members (not shown in the drawings) hanging down from the ceiling plate 29 of the support frame 12. As shown in FIG. 3, the pull-down belt mechanisms 52 and 52 are placed in such a way as to be symmetrical in the left-and-right direction across the tube 11a. The pull-down belt mechanisms 52 and 52 extend in the up-and-down direction along the tube 11a and downwardly convey, while sucking, the tubular film Fc wrapped around the tube 11a. Each of the pull-down belt mechanisms 52 and 52 has a drive roller 21, a driven roller 22, and a belt 23 that has a sucking function.

(2-3) Longitudinal Sealing Mechanism

The longitudinal sealing mechanism 53 is supported by a support member (not shown in the drawings) hanging down from the ceiling plate 29 of the support frame 12 and extends in the up-and-down direction along the tube 11a. The longitudinal sealing mechanism 53 heats the overlapping section of the tubular film Fc (both width direction sides of the tubular film Fc) wrapped around the tube 11a while pressing the overlapping section with regular applied pressure against the tube 11a to thereby heat-seal the overlapping section in the longitudinal direction. The longitudinal sealing mechanism 53 has a heater and a heater belt. The heater belt heated by the heater contacts the overlapping portion of the tubular film Fc, whereby the overlapping section of the tubular film Fc is heat-sealed.

(2-4) Guide Mechanism

As shown in FIG. 3, the guide mechanism 54 is placed under the tube 11a and above the transverse sealing mechanism 56. The guide mechanism 54 is a mechanism that transforms the lower end of the tubular film Fc. The guide mechanism 54 has a pair of guide members 41 and 41 that are placed on the inner side of the tubular film Fc. The pair of guide members 41 and 41 are capable of operating in such a way as to be symmetrical in the front-and-rear direction on the basis of a centerline of the tube 11a. The pair of guide members 41 and 41 rotate about one end on the upstream side. The guide mechanism 54 pushes out the tubular film Fc from its inner side in the depth direction (the front-and-rear direction) by causing the guide members 41 and 41 to operate after the lower seal portion SL2 has been formed in the tubular film Fc by the transverse sealing mechanism 56.

(2-5) Shutter Mechanism

As shown in FIG. 3, the shutter mechanism 55 is placed under the forming mechanism 51, the pull-down belt mechanisms 52 and 52, the longitudinal sealing mechanism 53, and the guide mechanism 54 and above the later-described transverse sealing mechanism 56 and is supported by the support frame 12.

The shutter mechanism 55 is a mechanism that suppresses biting of the articles C into a sealed place formed by the later-described transverse sealing mechanism 56 and has a pair of shutter members. The pair of shutter members are placed on the front side and on the rear side of the tubular film Fc. The pair of shutter members extend longer than the dimension of the tubular film Fc in a direction intersecting the up-and-down direction of the tubular film Fc.

The shutter mechanism 55 prevents biting of the articles C into the sealed place by repeatedly alternating between a first operation and a second operation. The first operation is an operation in which the shutter members descend a predetermined distance in a state in which they nip the tubular film Fc. The second operation is an operation in which the shutter members move away from the tubular film Fc and then move closer to and nip the tubular film Fc.

The shutter members nip the tubular film Fc earlier than sealing jaws 61a and 61b of the later-described transverse sealing mechanism 56 and suppress falling of the articles above the sealed place during transverse sealing of the tubular film Fc.

(2-6) Transverse Sealing Mechanism

As shown in FIG. 3, the transverse sealing mechanism 56 is placed under the forming mechanism 51, the pull-down belt mechanisms 52 and 52, the longitudinal sealing mechanism 53, the guide mechanism 54, and the shutter mechanism 55 and is supported by the support frame 12.

Figure 4:
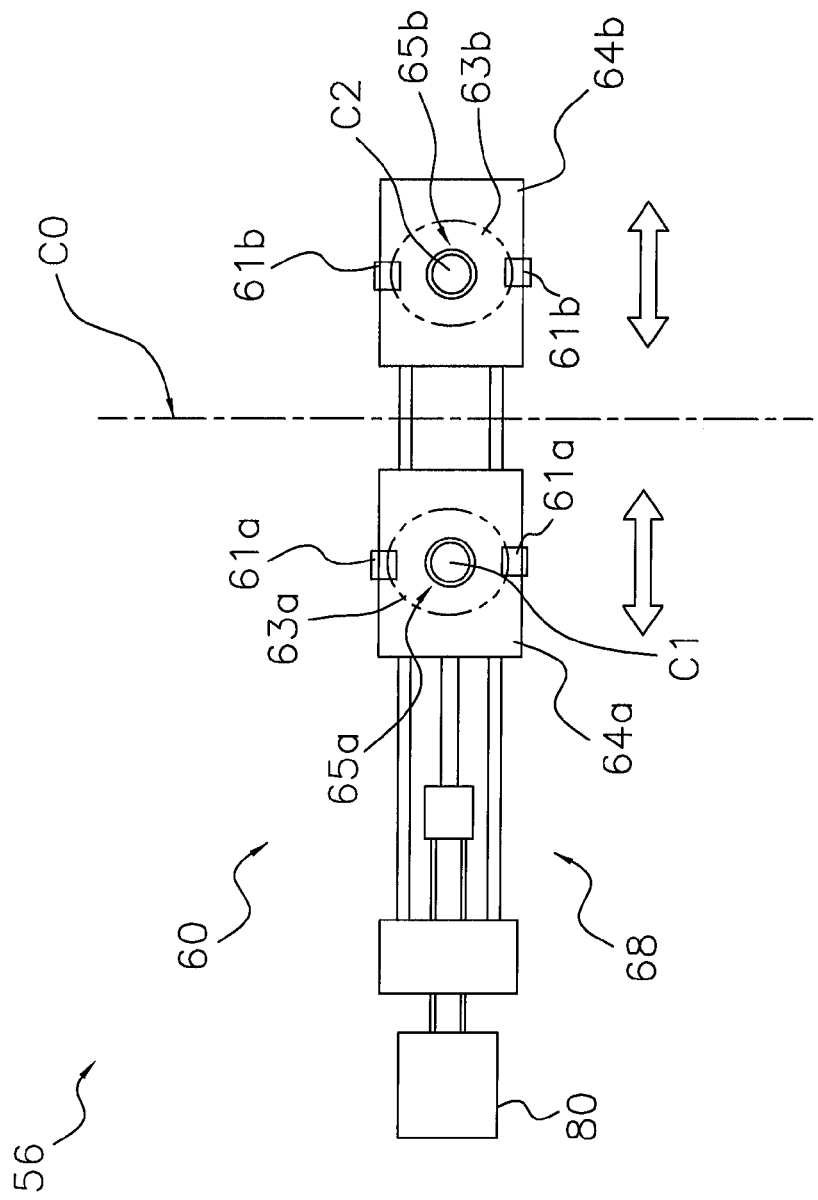
FIG. 4 is a schematic view of a transverse sealing mechanism.

The transverse sealing mechanism 56 heat-seals the tubular film Fc in a direction orthogonal to the tubular film Fc to form a sealed place. Moreover, the transverse sealing mechanism 56 cuts the sealed place to form the upper seal portion SL1 and the lower seal portion SL2. As shown in FIG. 4, the transverse sealing mechanism 56 has body portions 63a and 63b, rotating mechanisms 65a and 65b, a horizontal moving mechanism 60, and sealing jaws 61a and 61b.

(2-6-1) Body Portions

As shown in FIG. 4, the body portions 63 and 63b are placed sandwiching a broken line C0 and extend in a direction perpendicular to the page of FIG. 4. The body portions 63a and 63b support the sealing jaws 61a and 61b. The body portions 63a and 63b are driven by the rotating mechanisms 65a and 65b to rotate in opposite directions based on the broken line C0.

(2-6-2) Rotating Mechanisms

The rotating mechanisms 65a and 65b have center shafts C1 and C2, respectively, which extend perpendicularly to the page of FIG. 4. The center shafts C1 and C2 are disposed in the centers of the body portions 63a and 63b and are rotated by drive motors. Because of the rotation of the center shafts C1 and C2, the body portion 63a rotates clockwise in FIG. 4 and the body portion 63b rotates counter-clockwise in FIG. 4.

(2-6-3) Horizontal Moving Mechanism

The horizontal moving mechanism 60 is a mechanism that enables horizontal movement of the body portions 63a and 63b. Specifically, the horizontal moving mechanism 60 is a mechanism that moves the body portions 63a and 63b toward and away from each other in such a way that they are symmetrical in the front-and-rear direction based on the broken line C0 in FIG. 4. The horizontal moving mechanism 60 has horizontal moving plates 64a and 64b, a horizontal moving plate drive mechanism 68, and a drive motor 80. The horizontal moving plates 64a and 64b are attached respectively to both ends in the left-and-right direction (the direction perpendicular to the page of FIG. 4) of the body portions 63a and 63b. The horizontal moving plate drive mechanism 68 uses the drive motor 80 to horizontally move the horizontal moving plates 64a and 64b toward and away from each other.

(2-6-4) Sealing Jaws

Figure 5:
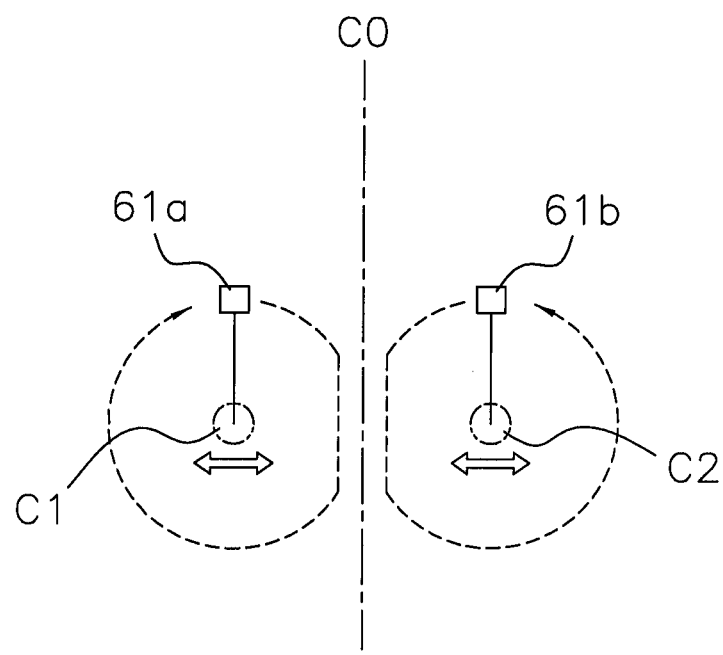
FIG. 5 is a side view of loci of sealing jaws.

The sealing jaws 61a and 61b are attached to the body portions 63a and 63b, respectively. The tubular film Fc is conveyed downward in a state in which the broken line C0 shown in FIG. 4 is in the width direction center of the tubular film Fc. The sealing jaws 61a and 61b extend longer than the dimension of the tubular film Fc in the left-and-right direction (i.e., the direction perpendicular to the page of FIG. 4). That is, the sealing jaws 61a and 61b are placed in a direction intersecting the length direction of the tubular film Fc. The sealing jaws 61a and 61b have sealing surfaces that contact the tubular film Fc. Further, the sealing jaws 61a and 61b each have a heater inside and use the heaters to heat the sealing surfaces. The sealing jaws 61a and 61b nip part of the tubular film Fc with the heated sealing surfaces to form the sealed place (the upper seal portion SL1 and the lower seal portion SL2) in the tubular film Fc. The sealing jaws 61a and 61b heat-seal the tubular film Fc in the transverse direction while revolving about the center shafts C1 and C2. Specifically, the sealing jaws 61a and 61b move in D-shaped loci by a combination of reciprocal motion in the horizontal direction resulting from the horizontal moving mechanism 60 and rotational motion resulting from the rotating mechanisms 65a and 65b (see FIG. 5). The sealing jaws 61a and 61b move in the horizontal direction and nip and heat-seal the tubular film Fc when they come closest to the tubular film Fc.

(2-7) First Folding Mechanism

Figure 12:
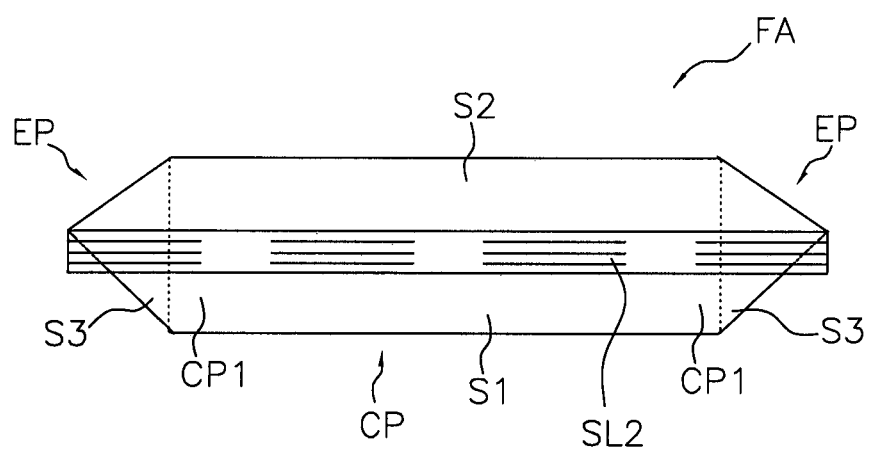
FIG. 12 is a bottom view of a bag lower portion.

The first folding mechanism 57 has a bottom plate 50 and an air cylinder that is one type of a reciprocating actuator. The bottom plate 50 is placed above the transverse sealing mechanism 56 (see FIG. 3). The reciprocating actuator is controlled by a speed controller. The bottom plate 50 reciprocally moves in the horizontal direction toward and away from the tubular film Fc. The bottom plate 50 contacts the lower portion of the tubular film Fc in a position closest to the tubular film Fc and pushes over the lower seal portion SL2 in a direction (the front-and-rear direction) intersecting the direction (the left-and-right direction) in which the lower seal portion SL2 extends. Because of this, the lower seal portion SL2 is folded with respect to the lower portion of the bag body portion FL, and a bag lower portion FA (see FIG. 12) is formed in the tubular film Fc. The bag lower portion FA is a section including the lower seal portion SL2 of the bag B1, the lower portion of the first surface S1, the lower portion of the second surface S2, and the lower portions of the side surfaces S3 and S3. The bag lower portion FA is thereafter transformed by the second folding mechanisms 58 and 58 to become the bottom portion FB (FIG. 11).

(2-8) Second Folding Mechanisms

As shown in FIG. 3, the second folding mechanisms 58 and 58 are placed above the transverse sealing mechanism 56. The second folding mechanisms 58 and 58 are placed on the right side and the left side on the basis of the centerline of the tube 11*a*. The second folding mechanisms 58 and 58 are mechanisms that push over side portions EP of the bag lower portion FA in the direction (the left-and-right direction) in which the lower seal portion SL2 extends. The second folding mechanisms 58 and 58 operate in such a way as to be symmetrical in the left-and-right direction on the basis of the centerline of the tube 11*a*.

Each of the second folding mechanisms 58 and 58 mainly has a side plate 81 and a support member 82. The side plate 81 has a predetermined length in the depth direction (the front-and-rear direction) of the tubular film Fc. The side plate 81 has a configuration in which it is capable of being rotated about one end on the upper side by an unillustrated driver. The support member 82 is a member that supports the side plate 81 and is driven by an air cylinder or the like. The air cylinder or the like is controlled by an unillustrated speed controller. The support members 82 are driven by the air cylinders to reciprocally move in diagonal directions and cause the side plates 81 to move toward and away from the side portions EP of the bag lower portion FA. The side plates 81 rotate upward in a state in which the bottom plate 50 is closest to the lower end of the tubular film Fc and fold the side portions EP of the bag lower portion FA with respect to neighboring portions CP1 (see FIG. 12) of the bag lower portion FA. The side portions EP and the neighboring portions CP1 are heat-sealed together by the residual heat that the lower seal portion SL2 has.

(2-9) Vibrating Mechanism

As shown in FIG. 3, the vibrating mechanism 59 is placed under the forming mechanism 51, the pull-down belt mechanisms 52 and 52, the longitudinal sealing mechanism 53, the guide mechanism 54, the shutter mechanism 55, and the transverse sealing mechanism 56. The vibrating mechanism 59 is a mechanism that imparts vibration to the lower end of the tubular film Fc. Specifically, the vibrating mechanism 59 is a mechanism that imparts vibration to the neighborhood of the lower seal portion SL2 of the tubular film Fc with respect to the tubular film Fc after the lower seal portion SL2 has been formed and before the upper seal portion SL1 is formed.

The vibrating mechanism 59 is mainly configured from an air cylinder 591, a cylindrical brush (rotating brush) 592, and a motor (not shown in the drawings) that causes the brush 592 to rotate (see FIG. 3 etc.). As shown in FIG. 3 and FIG. 7 to FIG. 9, the air cylinder 591 and the brush 592 are placed with a fall path FP of the bags B1 in between them. The fall path FP is a path down which the bags B1 fall after the sealed place of the tubular film Fc has been cut by the transverse sealing mechanism 56. Further, the fall path FP coincides with the conveyance path of the tubular film Fc. That is, the air cylinder 591 and the brush 592 are placed in positions in which they do not hinder the falling of the bags B1. Specifically, the air cylinder 591 is placed on the depth direction front side of the tubular film Fc. The brush 592 is placed on the depth direction rear side of the tubular film Fc. That is, the brush 592 is placed in a position (corresponding to a first position) in which it opposes the air cylinder 591 across the fall path FP.

(2-9-1) Air Cylinder

The air cylinder 591 is a type of reciprocating actuator and is controlled by an unillustrated speed controller. The air cylinder 591 has a contact portion 591*a*. The contact portion 591*a* moves back and forth between a standby position and a forwardly advanced position (see FIG. 7 to FIG. 9). The standby position is a position on the depth direction front side of the tubular film Fc (the outer side of the fall path FP) (see FIG. 7 and FIG. 9), and the forwardly advanced position is a position to which the contact portion 591*a* has forwardly advanced from the standby position toward the depth direction rear side of the tubular film Fc (see FIG. 8). The air cylinder 591 reciprocally moves between the standby position and the forwardly advanced position at predetermined time intervals. The air cylinder 591 contacts the neighborhood of the lower seal portion SL2 of the tubular film Fc short of the forwardly advanced position and, in the forwardly advanced position, tilts the lower end of the tubular film Fc to the depth direction rear side of the tubular film Fc. In other words, the air cylinder 591 contacts the neighborhood of the lower seal portion SL2 of the tubular film Fc inside the fall path FP and tilts the neighborhood of the lower seal portion SL2 to the outer side of the fall path FP to bring the neighborhood of the lower seal portion SL2 into contact with the brush 592. The air cylinder 591 retracts the contact portion 591*a* to the standby position after it has brought the neighborhood of the lower seal portion SL2 of the tubular film Fc into contact with the brush 592 for a predetermined amount of time (see FIG. 8 and FIG. 9). The air cylinder 591 tilts the lower end of the tubular film Fc to the outer side of the fall path FP to bring the lower end of the tubular film Fc into contact with the brush 592 after the tubular film Fc has been filled with the articles C and before the upper seal portion SL1 is formed in the tubular Fc.

(2-9-2) Brush

Figure 8:
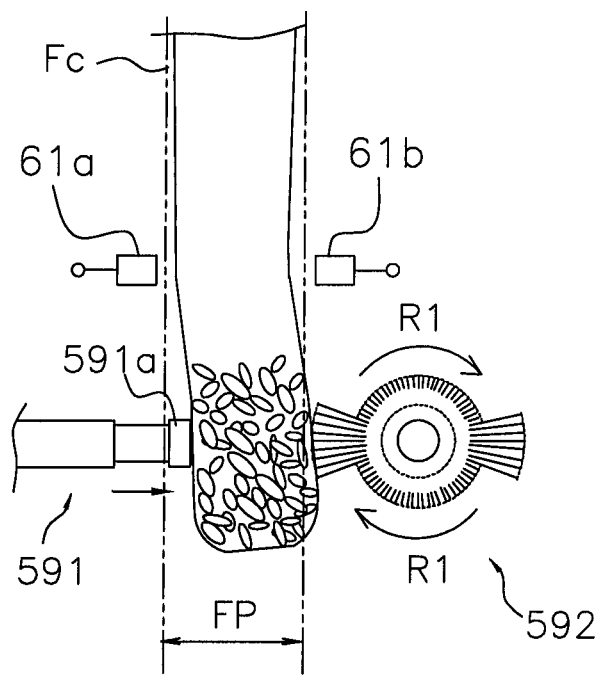
FIG. 8 is a view showing the movement of the vibrating mechanism.

As shown in FIG. 7, the brush 592 has a cylindrical core 592*a* in which bristles 592*b* and 592*c* made of resin are implanted. The core 592*a* is attached to a rotating shaft of a motor via a joint (not shown in the drawings). The brush 592 is driven by the motor to rotate. Further, the brush 592 is rotated in such a way as to contact the neighborhood of the lower seal portion SL2 of the tubular film Fc from the flow direction downstream side of the tubular film Fc to the upstream side. Specifically, the brush 592 rotates in the direction (clockwise direction) indicated by arrows R1 (see FIG. 7 and FIG. 8). Because of the rotation of the brush 592, vibration is imparted to the tubular film Fc from the lower end of the tubular film Fc. The bristles 592*b* and 592*c* include bristles of different lengths. Specifically, the bristles 592*b* and 592*c* include bristles 592*b* having a first length and bristles 592*c* having a second length shorter than the first length. The bristles 592*b* having the first length and the bristles 592*c* having the second length are placed in such a way as to impart large vibration to the tubular film Fc when the brush 592 rotates while contacting the neighborhood of the lower seal portion SL2 of the tubular film Fc. Specifically, the core 592*a* has first regions in which the bristles 592*b* having the first length are implanted and second regions in which the bristles 592*c* having the second length are implanted. Further, the first regions and the second regions are disposed adjacent to each other. In FIG. 7 to FIG. 9, as seen from the side the first regions and the second regions are placed in positions adjacent to each other, with a first region being placed in a position in which it opposes another first region and with a second region being placed in a position in which it opposes another second region. When vibration is imparted to the tubular film Fc by the brush 592, the articles C sparsely piled up inside the tubular film Fc and fragments and seasonings of the articles C adhering to the inner wall of the tubular film Fc fall downward in the conveyance direction of the tubular film Fc and gather together. The lower end of the tubular film Fc is tilted in such a way as to contact at least either of the bristles 592*b* in the first regions or the bristles 592*c* in the second regions when the air cylinder 591 has moved to the forwardly advanced position.

(2-10) Control Unit

The control unit 7 comprises a CPU, a ROM, a RAM, and a hard disk and reads and executes a program for controlling each part of the bag making and packaging machine 100. As shown in FIG. 6, the control unit 7 is connected to the film supplying unit 6, the pull-down belt mechanisms 52, the longitudinal sealing mechanism 53, the guide mechanism 54, the transverse sealing mechanism 56, the first folding mechanism 57, the second folding mechanisms 58 and 58, the vibrating mechanism 59, and the operation panel 8.

(3) Operation of Bag Making and Packaging Machine (3-1) Operation until Bottom Portion is Formed In conjunction with the driving of the pull-down belt mechanisms 52 and 52, the sheet-like film F is paid out from a film roll of the film supplying unit 6 and is sent to the forming mechanism 51. The sheet-like film F sent to the forming mechanism 51 is wrapped around the outer surface of the tube 11a while passing through the space between the former 11b and the tube 11a, and both width direction side portions of the film F are overlapped. The film F, both of whose width direction side portions are overlapped, is conveyed downward along the outer surface of the tube 11a by the pull-down belt mechanisms 52 and 52. Further, the overlapped section of the film F is heat-sealed in the longitudinal direction by the longitudinal sealing mechanism 53, whereby the sheet-like film F becomes the tubular film Fc.

Next, the tubular film Fc is heat-sealed by the sealing jaws 61a and 61b, whereby the sealed place is formed. The sealed place is cut by a cutter built into either of the sealing jaws 61a and 61b and becomes the upper seal portion SL1 of the leading bag B1 and the lower seal portion SL2 of the tubular film Fc (the trailing bag B1). That is, the leading bag B1 and the tubular film Fc (the trailing bag B1) are cut apart by the sealing jaws 61a and 61b (see FIG. 9).

After the leading bag B1 has been cut apart from the tubular film Fc, the bottom portion FB is formed in the tubular film Fc (the trailing bag B1). Specifically, the lower end of the tubular film Fc is pushed out in the front-and-rear direction by the guide mechanism 54. Thereafter, the bottom plate 50 of the first folding mechanism 57 approaches the tubular film Fc and pushes over the lower seal portion SL2 in the direction (the front-and-rear direction) intersecting the direction (the left-and-right direction) in which the lower seal portion SL2 extends. Because of this, the bag lower portion FA is formed in the tubular film Fc. Moreover, the second folding mechanisms 58 and 58 push over the side portions EP and EP of the bag lower portion FA in the direction (the left-and-right direction) in which the lower seal portion SL2 extends. The side portions EP and EP are heat-sealed to the neighboring portions CP1 and CP1 by the residual heat of the lower seal portion SL2. Because of this, the bottom portion FB is formed in the tubular film Fc.

A mass of the articles C falls from the combination weighing unit 2 immediately before the bottom portion FB is formed or immediately after the bottom portion FB has been formed.

(3-2) Operation after Bottom Portion Has Been Formed

The vibrating mechanism 59 operates in conjunction with the timing when the tubular film Fc in which the bottom portion FB has been formed is sent downstream in the conveyance direction. As shown in FIG. 7, when the lower end of the tubular film Fc is positioned on the upstream side of the sealing jaws 61a and 61b, the air cylinder 591 has its contact portion 591 standing by in the standby position, and the brush 592 also stands by without rotating. Next, as shown in FIG. 8, a predetermined quantity of the tubular film Fc is sent to the downstream side in the conveyance direction, and the air cylinder 591 moves the contact portion 591a to the forwardly advanced position at the timing when the lower end of the tubular film Fc is positioned in the neighborhood of the vibrating mechanism 59. The contact portion 591a contacts the neighborhood of the lower end of the tubular film Fc and tilts the lower end of the tubular film Fc to the outer side of the fall path FP to bring the neighborhood of the lower end of the tubular film Fc into contact with the brush 592. The brush 592 rotates in such a way as to contact the lower end of the tubular film Fc from the conveyance direction downstream side of the tubular film Fc to the upstream side and imparts vibration to the lower end of the tubular film Fc. When vibration is applied to the neighborhood of the lower end of the tubular film Fc for a predetermined amount of time, as shown in FIG. 9, the air cylinder 591 retracts the contact portion 591a to the standby position. Because of this, the lower end of the tubular film Fc returns to the inner side of the fall path FP from the outer side of the fall path FP, and the tubular film Fc no longer tilts. Thereafter, the sealed place is formed in the tubular film Fc by the sealing jaws 61a and 61b. That is, the place that becomes the upper seal portion SL1 of the leading bag B1 and the lower seal portion SL2 of the trailing bag B1 is formed in the tubular film Fc. The sealed place is cut by the cutter built into either of the sealing jaws 61a and 61b and becomes the upper seal portion SL1 of the leading bag B1 and the lower seal portion SL2 of the trailing bag B1. That is, the leading bag B1 and the tubular film Fc (the trailing bag B1) are cut apart by the sealing jaws 61a and 61b (see FIG. 9). The bag B1 is cut apart from the tubular film Fc and falls down the fall path FP.

(4) Characteristics (4-1)

The bag making and packaging machine 100 pertaining to the present embodiment packages the articles C whose specific gravity is small, such as potato chips. When the articles C whose specific gravity is small are dropped from above the tube 11a, the articles C pile on top of each other with large spaces in between inside the packaging material. That is, it is easy for the articles C to become bulky inside the tubular film Fc.

However, in the bag making and packaging machine 100 pertaining to the present embodiment, vibration is imparted to the lower end of the tubular film Fc by the vibrating mechanism 59 after the tubular film Fc has been filled with the articles C and before the upper seal portion SL1 is formed in the tubular film Fc. Because of the vibration, the articles C move inside the tubular film Fc such that the spaces formed between the articles C become smaller. That is, the articles C gather together inside the tubular film Fc and the bulkiness is eliminated. Further, in accompaniment with the elimination of the bulkiness, the fill rate of the articles C inside the tubular film Fc can be raised. Moreover, because of the vibration imparted to the tubular film Fc, seasonings and fragments of the articles C adhering to the inside surface of the tubular film Fc can be caused to fall, and biting of the articles C into the sealed place can be reduced.

(4-2)

Moreover, in the bag making and packaging machine 100 pertaining to the present embodiment, the vibrating mechanism 59 is configured by the air cylinder 591 and the brush 592. The air cylinder 591 and the brush 592 are placed on the outer side of the fall path (the conveyance path of the tubular film Fc) FP of the bags B1. In other words, the air cylinder 591 and the brush 592 are placed in locations in which they do not hinder the falling of the bags B1. Because of this, the amount of time needed to allow the bags B1 to fall can be reduced, and overall the efficiency with which the bags B1 are produced by the bag making and packaging machine 100 can be improved.

(4-3)

Further, in the bag making and packaging machine 100 pertaining to the present embodiment, when the contact portion 591a of the air cylinder 591 moves from the standby position to the forwardly advanced position, the contact portion 591a contacts the lower end of the tubular film Fc and moves the lower end of the tubular film Fc to the outer side of the fall path FP. That is, the lower end of the tubular film Fc is tilted to the outer side of the fall path FP by the operation of the air cylinder 591. The lower end of the tubular film Fc moves to a position in which it is capable of contacting the brush 592, and vibration is imparted to the lower end of the tubular film Fc by the brush 592. Because of this, vibration can be imparted reliably to the neighborhood of the lower seal portion SL2 of the tubular film Fc. Further, by imparting vibration to the neighborhood of the lower seal portion SL2, the articles C inside the tubular film Fc can be moved effectively.

(4-4)

Further, the brush 592 pertaining to the present embodiment has the core 592a and the bristles 592b and 592c implanted in the core 592a and having two types of different lengths. The core 592a has the first regions in which the bristles 592b having the first length are implanted and the second regions in which the bristles 592c having the second length are implanted, and the first regions and the second regions are alternately disposed in the core 592a. That is, the first regions and the second regions are disposed adjacent to each other. The brush 592 contacts the lower end of the tubular film Fc while rotating, so the bristles 592b having the first length and the bristles 592c having the second length alternately contact the lower end of the tubular film Fc. Because of this, larger vibration can be imparted to the lower end of the tubular film Fc by the brush 592.

(4-5)

Moreover, the brush 592 is rotated in such a way as to contact the tubular film Fc from the conveyance direction downstream side of the tubular film Fc to the upstream side. Consequently, the articles C inside the tubular film Fc first move slightly in the opposite direction (upward) of the falling direction and then again fall from there. Consequently, the spaces between the articles C inside the tubular film Fc can be reduced effectively.

(5) Modifications (5-1)

In the bag making and packaging machine 100 pertaining to the above embodiment, a transverse sealing mechanism capable of continuous bag making and packaging is disposed, but instead of this transverse sealing mechanism a transverse sealing mechanism capable of intermittent operation may also be disposed.

(5-2)

The bag making and packaging machine 100 pertaining to the above embodiment makes the flat-bottom bags B1, but the shape of the bags that are made is not limited to the flat-bottom bags B1. For example, the bag making and packaging machine 100 may also make pillow bags B2 (see FIG. 13). The pillow bag B2 comprises a bag body portion FL that surrounds the articles C and an upper seal portion SL1 and a lower seal portion SL2 that are positioned on the upper side and the lower side of the bag body portion FL. A longitudinal seal portion LSP that extends in the longitudinal direction is formed on the back surface of the bag B2. In the case of making the pillow bag B2, the first folding mechanism 57 and the second folding mechanisms 58 and 58 are removed from the configuration of the bag making and packaging machine 100 pertaining to the above embodiment. Because of this, in regard also to the pillow bag B2, the fill rate of the articles C can be improved, and the articles C that can bite into the upper seal portion SL1 and the lower seal portion SL2 can be reduced.

(5-3)

In the bag making and packaging machine 100 pertaining to the above embodiment, the shape of the brush 592 is not limited to the shape exemplified in FIG. 3 and FIG. 7 to FIG. 9. For example, the number of the first regions and the second regions disposed on the core 592a of the brush 592 is not limited to two each and may also be three or more each. Further, the vibration imparted to the tubular film Fc may also be made complex by making the lengths of the bristles of the brush 592 regular and partially changing the densities of the bristles implanted in the core 592a. Moreover, the brush 592 may also be driven by an eccentric motor. That is, the aspect of the brush 592 may be any aspect as long as it is an aspect where vibration can be imparted effectively from the brush 592 to the lower end of the tubular film Fc when the lower end of the tubular film Fc has been pressed against the brush 592 by the operation of the air cylinder 591.

REFERENCE SIGNS LIST

2 Combination Weighing Unit
5 Bag Making and Packaging Unit
6 Film Supplying Unit
7 Control Unit
51 Forming Mechanism
52 Pull-down Belt Mechanism
53 Longitudinal Sealing Mechanism
54 Guide Mechanism
55 Shutter Mechanism
56 Transverse Sealing Mechanism
57 First Folding Mechanism
58 Second Folding Mechanism
59 Vibrating Mechanism
100 Bag Making and Packaging Machine
591 Cylinder
591a Contact Portion
592 Brush
B1 Flat-bottom Bag
SL1 Upper Seal Portion
SL2 Lower Seal Portion
FA Bag Lower Portion
FB Bottom Portion
EP Side Portions
CP1 Neighboring Portion
FP Fall Path

The invention claimed is:
1. A bag making and packaging machine comprising:
a conveyance mechanism for conveying a packaging material in a conveyance direction, the conveyance direction extending vertically downward below the conveyance mechanism defining a fall path of the packaging material that coincides with the conveyance direction, the fall path being further defined as a path along which the packaging material moves vertically downward in the conveyance direction;
a tube formation mechanism for forming the packaging material into a tubular shape;
a transverse seal formation mechanism for forming a first transverse seal portion at the packaging material before the packaging material is filled with articles, and forming a second transverse seal portion in the packaging material after the packaging material is filled with the articles, thereby forming a bag, and a vibrating mechanism including:

a pushing member for pushing the packaging material, and a vibration applying member for applying vibration to the packaging material;

the vibrating mechanism is movable between two arrangements whereby a first arrangement includes the pushing member pushing the packaging material in a direction transverse to the conveyance direction such that the packaging material is at least partially pushed out of the fall path, and the vibration applying member applies vibration to the packaging material; and a second arrangement includes the pushing member being moved away from the packaging material, with the packaging material being spaced apart from the vibration applying member, allowing the bag to fall freely down the fall path.

2. The bag making and packaging machine according to claim 1, further comprising a longitudinal sealing mechanism that forms the packaging material into a tubular shape by heat-sealing both width direction sides of the packaging material and the transverse seal formation mechanism heat sealing the tubular packaging material in a direction transverse to the conveyance direction of the packaging material.

3. The bag making and packaging machine according to claim 1, wherein the vibrating mechanism includes a rotating brush that is located on a first side of the fall path and a pushing member that is located on a second side of the fall path opposite the first side and the pushing member is configured to move the packaging material in the horizontal direction toward the rotating brush and into contact with the rotating brush.

4. The bag making and packaging machine according to claim 3, wherein the pushing member has a contact section that contacts the packaging material, the contact section contacts the packaging material at a location adjacent to the first transverse seal portion and tilts the packaging material adjacent to the first transverse seal portion toward the first position prior to the second transverse seal portion being formed, and the rotating brush contacts and imparts vibration to the packaging material adjacent to the first transverse seal portion.

5. The bag making and packaging machine according to claim 3, wherein the rotating brush has first sections including bristles of a first length and second sections including bristles of a second length longer than the first length.

6. The bag making and packaging machine according to claim 3, wherein the rotating brush rotates in a direction such that contact with the packaging material is in a direction opposite to the conveyance direction.

7. The bag making and packaging machine according to claim 2, wherein the vibrating mechanism includes a rotating brush that is located in a first position located on a first side of the fall path and a pushing member that is located in a second position located on a second side of the fall path opposite the first position and the pushing member moves the packaging material in the horizontal direction toward the rotating brush and into contact with the rotating brush.

8. The bag making and packaging machine according to claim 7, wherein the pushing member has a contact section that contacts the packaging material, the contact section contacts the packaging material at a location adjacent to the first transverse seal portion and tilts the packaging material adjacent to the first transverse seal portion toward the first position prior to the second transverse seal portion being formed, and the rotating brush contacts and imparts vibration to the packaging material adjacent to the first transverse seal portion.

9. The bag making and packaging machine according to claim 4, wherein the rotating brush has first sections including bristles of a first length and second sections including bristles of a second length longer than the first length.

10. The bag making and packaging machine according to claim 4, wherein the rotating brush rotates in a direction such that contact with the packaging material is in a direction opposite to the conveyance direction.

11. The bag making and packaging machine according to claim 5, wherein the rotating brush rotates in a direction such that contact with the packaging material is in a direction opposite to the conveyance direction.

12. A bag making and packaging machine comprising a conveyance mechanism for conveying a packaging material in a conveyance direction, the conveyance direction extending vertically downward below the conveyance mechanism defining a fall path of the packaging material that coincides with the conveyance direction, the fall path being further defined as a path along which the packaging material moves vertically downward in the conveyance direction;

a transverse seal formation mechanism configured to form a first transverse seal portion in the packaging material, the first transverse seal portion being transverse to conveyance direction of the packaging material, and a vibrating mechanism located downstream from the transverse seal formation mechanism relative to the conveyance direction of the packaging material, the vibrating mechanism including:

a pushing member for pushing the packaging material, and a vibration applying member for applying vibration to the packaging material;

the vibrating mechanism is movable between two arrangements whereby a first arrangement includes the pushing member pushing the packaging material in a direction transverse to the conveyance direction such that the packaging material is at least partially pushed out of the fall path, and the vibration applying member applies vibration to the packaging material; and a second arrangement includes the pushing member being moved away from the packaging material, with the packaging material being spaced apart from the vibration applying member, allowing the bag to fall freely down the fall path being.

13. The bag making and packaging machine according to claim 12, further comprising a longitudinal sealing mechanism that forms the packaging material into a tubular shape by heat-sealing both width direction sides of the packaging material and the transverse seal formation sealing mechanism heat sealing the tubular packaging material forming a sealed place and further includes a cutting mechanism that cuts the sealed place to form the first transverse seal portion of a first bag and the second transverse seal portion of a second bag.

14. The bag making and packaging machine according to claim 12, wherein
the vibrating applying member is a rotating brush that is located on a first side of the fall path and
the pushing member is located on a second side of the fall path opposite the first side and
the pushing member is configured to move the packaging material in the horizontal direction toward the rotating brush and into contact with the rotating brush.

15. The bag making and packaging machine according to claim 14, wherein
the pushing member has a contact section that contacts the packaging material,
the contact section contacts the packaging material at a location adjacent to the first transverse seal portion and tilts the packaging material adjacent to the first transverse seal portion toward the first position prior to the second transverse seal portion being formed, and
the rotating brush contacts and imparts vibration to the packaging material adjacent to the first transverse seal portion.

16. The bag making and packaging machine according to claim 14, wherein the rotating brush has first sections including bristles of a first length and second sections including bristles of a second length longer than the first length.

17. The bag making and packaging machine according to claim 14, wherein the rotating brush rotates in a direction such that contact with the packaging material is in a direction opposite to the conveying direction.

18. The bag making and packaging machine according to claim 15, wherein the rotating brush has first sections including bristles of a first length and second sections including bristles of a second length longer than the first length.

19. The bag making and packaging machine according to claim 15, wherein the rotating brush rotates in a direction such that contact with the packaging material is in a direction opposite to the conveying direction.

20. The bag making and packaging machine according to claim 13, wherein
the pushing member has a contact section that contacts the packaging material,
the contact section contacts the packaging material at a location adjacent to the first transverse seal portion and tilts the packaging material adjacent to the first transverse seal portion toward the first position prior to the second transverse seal portion being formed, and
the rotating brush contacts and imparts vibration to the packaging material adjacent to the first transverse seal portion.

* * * * *